US011115617B2

(12) United States Patent
Wolff et al.

(10) Patent No.: US 11,115,617 B2
(45) Date of Patent: Sep. 7, 2021

(54) AUDIO DEVICE FOR HDMI

(71) Applicant: DOLBY LABORATORIES LICENSING CORPORATION, San Francisco, CA (US)

(72) Inventors: Christian Wolff, San Leandro, CA (US); David Matthew Fischer, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 16/770,089

(22) PCT Filed: Dec. 13, 2018

(86) PCT No.: PCT/US2018/065546
§ 371 (c)(1),
(2) Date: Jun. 5, 2020

(87) PCT Pub. No.: WO2019/125920
PCT Pub. Date: Jun. 27, 2019

(65) Prior Publication Data
US 2020/0351465 A1 Nov. 5, 2020

Related U.S. Application Data

(60) Provisional application No. 62/608,827, filed on Dec. 21, 2017.

(30) Foreign Application Priority Data

Dec. 21, 2017 (EP) .................................. 17209739

(51) Int. Cl.
*H04N 5/60* (2006.01)
*G06F 3/16* (2006.01)
*H04R 3/00* (2006.01)

(52) U.S. Cl.
CPC ............. *H04N 5/602* (2013.01); *G06F 3/162* (2013.01); *H04R 3/00* (2013.01)

(58) Field of Classification Search
CPC .............................................. H04N 21/43635
See application file for complete search history.

(56) References Cited

U.S. PATENT DOCUMENTS 9,693,109 B1 *  6/2017 Mishra ............... H04N 21/4852
9,986,200 B1 *  5/2018 Tsai ..................... H04N 21/816
(Continued)

FOREIGN PATENT DOCUMENTS

| WO | 20161489351 | 9/2016 |
|----|-------------|--------|
| WO | 2016202242 | 12/2016 |
| WO | 20162022421 W | 12/2016 |

*Primary Examiner* — Paulos M Natnael

(57) ABSTRACT

An apparatus, method and system for connecting High-Definition Multimedia Interface (HDMI) devices. A loopback device connects between a first source device and a sink device on a first connection; a second source device connects to the sink device on a second connection. The loopback device manages the first connection, passes transition-minimized differential signaling (TMDS) or fixed-rate link (FRL) signals through to the sink device, and outputs audio received from the sink device on the audio return channel (ARC) or enhanced audio return channel (eARC). In this manner, audio that originates from any source device may be output without requiring a direct connection to the loopback device.

20 Claims, 5 Drawing Sheets

(56) References Cited

U.S. PATENT DOCUMENTS

| | | | |
|---|---|---|---|
| 10,013,328 B2* | 7/2018 | Hardt | G06F 11/327 |
| 10,182,193 B2* | 1/2019 | Gopinath | G06K 9/00758 |
| 10,477,141 B1* | 11/2019 | Huang | H04N 21/435 |
| 10,855,935 B2* | 12/2020 | Gopinath | H04N 21/4122 |
| 2011/0142245 A1 | 6/2011 | Toba | |
| 2011/0176057 A1 | 7/2011 | Okamura | |
| 2011/0283129 A1 | 11/2011 | Guillerm | |
| 2012/0188456 A1* | 7/2012 | Kuroyanagi | H04N 5/765 |
| | | | 348/569 |
| 2013/0021536 A1 | 1/2013 | Kamida | |
| 2017/0195722 A1 | 7/2017 | Seo | |
| 2017/0195726 A1* | 7/2017 | Aggarwal | H04N 21/43635 |
| 2020/0029121 A1* | 1/2020 | Zhang | H04N 21/434 |
| 2020/0092621 A1* | 3/2020 | Suzuki | H01R 31/065 |

\* cited by examiner

AUDIO DEVICE FOR HDMI

CROSS REFERENCE TO RELATED APPLICATIONS

This application claims priority to U.S. Provisional Application No. 62/608,827 and European Patent Application No. 17209739.6 both filed on Dec. 21, 2017, each of which is incorporated by reference in its entirety.

BACKGROUND

The present invention relates to audio/visual systems, and in particular, to interconnecting audio/video source devices, display devices, and speakers.

Unless otherwise indicated herein, the approaches described in this section are not prior art to the claims in this application and are not admitted to be prior art by inclusion in this section.

A traditional audio/video setup is as follows. An audio/video receiver (referred to as an AVR or simply a receiver) connects multiple source devices such as a first source device (e.g., a set-top box) and a second source device (e.g., a Blu-ray Disc® player) to a sink device (e.g., a display device such as a high-definition television (HDTV)); a soundbar (e.g., a connection device that also includes speakers) may also perform the function of the AVR. The AVR (or soundbar) outputs audio via connected speakers (or included speakers, for the soundbar). In this traditional setup, the AVR receives a user selection to select one of the source devices, receives the audio/video stream from the selected source device, provides the video stream to the HDTV, and provides the audio stream to the speakers.

One issue with this traditional setup is that each device typically is associated with its own remote control device. For example, the user uses a first remote to control the AVR to select the source device and to control the volume for the speakers, a second remote to control the first source device when it is selected, a third remote to control the second source device when it is selected, and a fourth remote to control the display device. This quantity of remotes can be unwieldy. A potential solution is that often the functionality of multiple remotes may be combined into a single remote, but the configuration of such an arrangement still involves some effort.

Another issue with this traditional setup is that audio-visual media standards are evolving. For example, the high-definition multimedia interface (HDMI) standard is commonly used for interconnecting audio/visual devices. When one of the devices takes advantage of an updated HDMI standard, generally the other devices will need to be updated as well. For example, assume a current setup uses HDMI version 1.4, and the user upgrades their HDTV to 4K resolution, which requires HDMI version 2.0. Not only will the user then need to upgrade one of the source devices to HDMI version 2.0 in order to source the 4K audio/video stream, but also they will need to upgrade the AVR (or soundbar) to HDMI version 2.0 in order to provide the selected source to the 4K HDTV. Such constant upgrading of multiple devices can diminish the user experience.

A second traditional setup is as follows. This second traditional setup is similar to the first traditional setup (a first source device, a second source device, a display device, an AVR, and speakers), with the addition of the display device being a smart display device for interacting with streaming media (e.g., a Netflix™ app, an Amazon Instant™ app, a Skype™ app, etc.). In the second traditional setup, the display device receives a user selection to select the streaming media, displays the streaming media, and sends an audio signal to the AVR (e.g., over the audio return channel (ARC) of an HDMI connection) for output by the speakers. This second traditional setup has similar issues to the first traditional setup.

A third traditional setup is as follows. In this third traditional setup, all source devices are connected to the sink device. The sink device may then output an audio signal via a S/PDIF (Sony/Philips Digital Interface Format) TOSLINK (Toshiba Link) cable to an AVR (or soundbar) via the optical input. This third traditional setup has the issue that the TOSLINK connection does not support some modern (and future) sound formats.

SUMMARY

Given the above, there is a need to improve the user experience related to audio/visual systems. An embodiment is directed to an improved audio/video receiver, referred to as a loopback device.

In general, the loopback device connects between one source device and the display device; the other source device connects directly to the display device. The user then uses the display device to select the audio/video stream, and the display device sends the audio signal to the loopback device (e.g., over the ARC).

As compared to the traditional setups described in the background, embodiments have a number of differences and advantages. One difference is that the loopback device just "passes through" the audio/visual stream from the source device to the display device. (The traditional AVR operates as a transmitter/receiver, to receive the stream from the source device, and to re-transmit the stream to the display device.) Thus, when the user upgrades the source device and the display device, the user is not required to upgrade the loopback device.

Another difference is that the user uses the display device to select the source. Thus, the number of remotes may be reduced. Furthermore, as the vast majority of AV installations have users connecting directly to their TV, the complexity of updating existing installations when adding a sound reproducing device other than TV speakers, is greatly reduced.

Another difference is that the loopback device receives an audio stream over the ARC from a source other than the smart display app. As an example, assume the loopback device is connected to the first source device, and the second source device is connected directly to the display device. When the first source device is selected, the loopback device passes through the first audio/visual stream to the display device, the display device displays the first video stream, and the display device uses the ARC to "loop back" the first audio stream to the loopback device. When the second source device is selected, the display device displays the second video stream (without involving the loopback device), and the display device uses the ARC to "loop back" the second audio stream to the loopback device.

According to an embodiment, an apparatus connects High-Definition Multimedia Interface (HDMI) devices. The apparatus includes a first HDMI interface that is configured to connect to a first HDMI source device, a second HDMI interface that is configured to connect to an HDMI sink device, and a processor. The processor is configured to control the apparatus to pass a first signal through from the first HDMI source device to the HDMI sink device via a first HDMI connection. The HDMI sink device is configured to select a selected signal, where the selected signal is one of a plurality of signals including the first signal from the first HDMI source device via the first HDMI connection and a second signal from a second HDMI source device via a second HDMI connection. (The second HDMI connection differs from the first HDMI connection.) The processor is configured to control the apparatus to control the apparatus to receive, via loopback from the HDMI sink device, a selected audio signal; the selected audio signal corresponds to the selected signal, as selected by the HDMI sink device. The processor is configured to control the apparatus to output the selected audio signal to a speaker.

The first HDMI connection includes a source connection and a sink connection, and the selected audio signal may be received from the HDMI sink device via an audio return channel (ARC) of the sink connection. Alternatively, the selected audio signal may be received from the HDMI sink device via an enhanced audio return channel (eARC) of the sink connection.

When the selected audio signal is associated with the second HDMI connection, the selected audio signal may be received from the HDMI sink device via an audio return channel (ARC) of the first HDMI connection.

When the selected audio signal corresponds to one of a first audio signal associated with the first signal, a second audio signal associated with the second signal, and a third audio signal associated with a third signal (as selected by the HDMI sink device), the third audio signal may be associated with a different source than the first HDMI source device and the second HDMI source device, and the selected audio signal may be received from the HDMI sink device via an audio return channel (ARC) of the first HDMI connection.

When the selected audio signal corresponds to one of a first audio signal associated with the first signal, a second audio signal associated with the second signal, and a third audio signal associated with a third signal (as selected by the HDMI sink device), the third audio signal may be associated with a different source than the first HDMI source device and the second HDMI source device, where the selected audio signal corresponds to the third audio signal, and the selected audio signal may be received from the HDMI sink device via an audio return channel (ARC) of the first HDMI connection.

The first HDMI interface and the second HDMI interface may include a transition-minimized differential signaling (TMDS) channel, where the apparatus is configured to pass the first signal through from the first HDMI source device to the HDMI sink device on the TMDS channel. Alternatively, the apparatus may be configured to pass the first signal through from the first HDMI interface to the second HDMI interface on the TMDS channel. As a further alternative, the first HDMI interface may be configured to receive the first signal from the first HDMI source device, the apparatus may be configured to pass the first signal through from the first HDMI interface to the second HDMI interface on the TMDS channel, and the second HDMI interface may be configured to send the first signal to the HDMI sink device.

The first HDMI interface and the second HDMI interface may include a fixed-rate link (FRL) channel, where the apparatus is configured to pass the first signal through from the first HDMI source device to the HDMI sink device on the FRL channel.

The processor may be configured to control the apparatus to receive a physical address from an Extended Display Identification Data (EDID) of the HDMI sink device, to generate a modified EDID, and to provide the modified EDID to the HDMI source device; the HDMI source device may be configured to use the modified EDID instead of the EDID to generate the first signal.

The apparatus may have the form factor of a dongle, or of a soundbar.

According to another embodiment, a method connects High-Definition Multimedia Interface (HDMI) devices. The method includes passing through, by a loopback device, a first signal from a first HDMI source device to an HDMI sink device via a first HDMI connection. The method further includes selecting, by the HDMI sink device, a selected signal, where the selected signal is one of a plurality of signals including the first signal from the first HDMI source device via the first HDMI connection and a second signal from a second HDMI source device via a second HDMI connection. (The second HDMI connection differs from the first HDMI connection.) The method further includes receiving, by the loopback device from the HDMI sink device via loopback, a selected audio signal, where the selected audio signal corresponds to the selected signal, as selected by the HDMI sink device. The method further includes outputting, by the loopback device, the selected audio signal to a speaker.

The method may include similar details to those discussed above regarding the apparatus.

According to another embodiment, a system includes a first HDMI source device, a second HDMI source device, an HDMI sink device, a speaker, and a loopback device. The loopback device includes similar details to those discussed above regarding the apparatus, such as passing signals through from the first HDMI source device to the HDMI sink device, and receiving a selected audio signal via loopback from the HDMI sink device.

The following detailed description and accompanying drawings provide a further understanding of the nature and advantages of various implementations.

DETAILED DESCRIPTION

Figure 1:
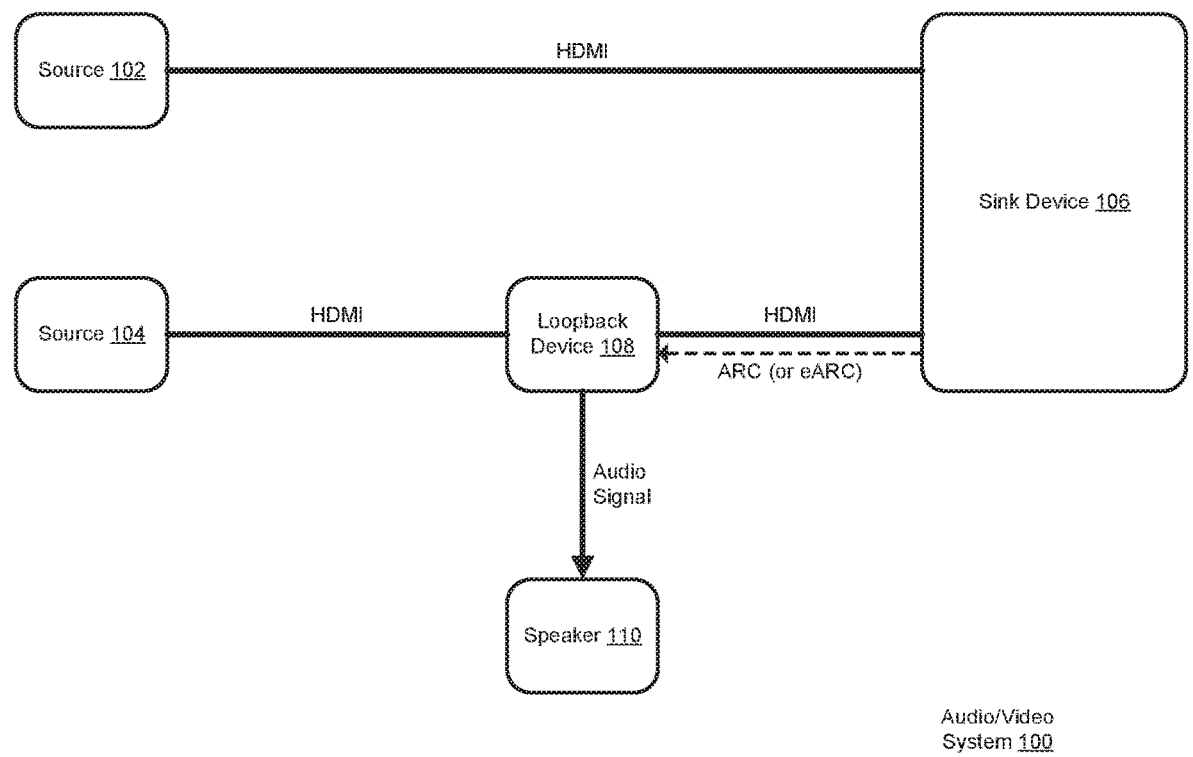
FIG. 1 is a block diagram of an audio/video system 100.

Described herein are techniques for using the HDMI audio return channel (ARC). In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document describes using implementations of the High-Definition Multimedia Interface (HDMI) standard. In general, HDMI is an audio/video interface for transmitting uncompressed video data and compressed or uncompressed digital audio data from an HDMI source device (e.g., a display controller, etc.) to an HDMI sink device (e.g., a computer monitor, video projector, digital television, digital audio device, etc.). HDMI implements the EIA/CEA (Electronic Industries Alliance/Consumer Electronics Association) 861 standard, which defines video formats, transport of compressed and uncompressed (i.e. linear pulse code modulation (LPCM)) audio, auxiliary data, and implementations of the Video Electronics Standards Association (VESA) Extended Display Identification Data (EDID). Several versions of HDMI have been developed and deployed since initial release of the technology, but all use the same cable and connector in a 19-pin configuration.

For digital audio, HDMI has a baseline format of stereo (uncompressed) PCM. Other formats are optional, with HDMI allowing up to 8 channels of uncompressed audio at sample sizes of 16-bit, 20-bit and 24-bit, with sample rates of 32 kHz, 44.1 kHz, 48 kHz, 88.2 kHz, 96 kHz, 176.4 kHz and 192 kHz. HDMI also carries any International Electrotechnical Commission (IEC) 61937-compliant (e.g., Sony/Philips Digital Interface Format—S/PDIF) compressed audio stream, such as Dolby Digital® and DTS® (Dedicated To Sound), and up to 8 channels of one-bit Direct Stream Digital (DSD) audio (used on Super Audio compact discs (CDs)) at rates up to four times that of Super Audio CD. With version 1.3, HDMI allows lossless compressed audio streams Dolby® TrueHD and DTS-HD (Dedicated To Sound High Definition) Master Audio.

The HDMI Audio Return Channel (ARC) was introduced in the HDMI 1.4 standard. "Return" refers to the case where the audio comes from the TV and can be sent "upstream" to the AV receiver using the HDMI cable connected to the AV receiver. As an example, consider a TV that directly receives a terrestrial/satellite broadcast (or has a video source built in, or implements a streaming app, etc.), and sends the audio "upstream" to the AV receiver. The ARC is associated with HDMI Ethernet, together referred to as the HDMI Ethernet and Audio Return Channel (HEAC) feature. HEAC adds a high-speed bidirectional data communication link (HEC) and the ability to send audio data upstream to the source device (ARC). HEAC utilizes two lines from the connector: the Reserved pin (pin 14, called HEAC+) and the Hot Plug Detect pin (pin 19, called HEAC−). If only ARC transmission is required, a single mode signal using the HEAC+ line can be used; otherwise, HEC is transmitted as a differential signal over the pair of lines, and ARC as a common mode component of the pair.

The HDMI Enhanced Audio Return Channel (eARC) was introduced in the HDMI 2.1 standard. eARC may be used for lossless audio formats such as Dolby® TrueHD and DTS-HD (Dedicated To Sound High Definition) Master Audio, which can carry object-based audio formats such as Dolby® Atmos™ and DTS:X™ format at the highest quality. eARC is otherwise similar to ARC, and references herein to ARC should be read as including references to eARC as appropriate.

FIG. 1 is a block diagram of an audio/video system 100. The audio/video system 100 includes a first source device 102, a second source device 104, a sink device 106, a loopback device 108, and a speaker 110. In general, these devices (other than the speaker 110) are HDMI compatible devices, and implement HDMI connections. The audio/video system 100 is a typical system setup for a home environment, where a single sink device connects to multiple source devices, and is associated with speakers.

The first source device 102 and the second source device 104 generally correspond to HDMI compatible devices, such as a set-top box (e.g., for receiving a cable or satellite signal), a disc player (e.g., a Blu-ray Disc® player), a gaming console (e.g., Microsoft Xbox One™), a video camera, a computer, etc. The sink device 106 generally corresponds to an HDMI compatible display device, e.g. a high definition television (HDTV). In general, an HDMI cable connects the first source device 102 and the sink device 106.

The loopback device 108 provides an HDMI connection between the second source device 104 and the sink device 106. In general, the loopback device 108 "passes through" the HDMI signal from the second source device 104 to the sink device 106, as further detailed below.

In general, the loopback device 108 receives an audio signal from the sink device 106. The audio signal corresponds to a selected HDMI stream (e.g., an HDMI stream from the first source device 102, an HDMI stream from the second source device 104, etc.). In general, the sink device 106 and the loopback device 108 use the HDMI Audio Return Channel (ARC) or eARC for this purpose. Since the loopback device 108 does not receive the HDMI stream from the first source device 102, the sink device 106 uses the ARC to provide the corresponding audio signal. However, even though the loopback device 108 does receive the HDMI stream from the second source device 104, since it passes the HDMI signal through to the sink device 106, the sink device 106 uses the ARC to provide the corresponding audio signal. In this manner, the audio signal is "looped back" to the loopback device 108.

The sink device 106 may perform decoding of the audio signal if the audio signal is encoded in the selected HDMI stream.

In addition to the features discussed in more detail herein, the loopback device 108 may implement one or more of the features described in International Application Pub. No. WO 2016/148935 A1, which is incorporated herein by reference. For example, the loopback device 108 may include a wireless transceiver for communicating with a remote control device. As an example, the loopback device 108 may include an IEEE 802.15.1 compliant transceiver that pairs with a mobile telephone, enabling the loopback device 108 to be controlled by an app executed by the mobile telephone. It may also include audio amplification and speakers, depending on form factor.

The speaker 110 generally outputs the audio signal provided by the loopback device 108. Although only one speaker 110 is shown, the speaker 110 may include multiple speakers, such as a headset, six speakers implementing 5.1 surround sound, etc. The loopback device 108 may provide the audio signal to the speaker 110 via a wired connection or a wireless connection.

The operation of the audio/video system 100 is described below with reference to FIG. 2.

Figure 2:
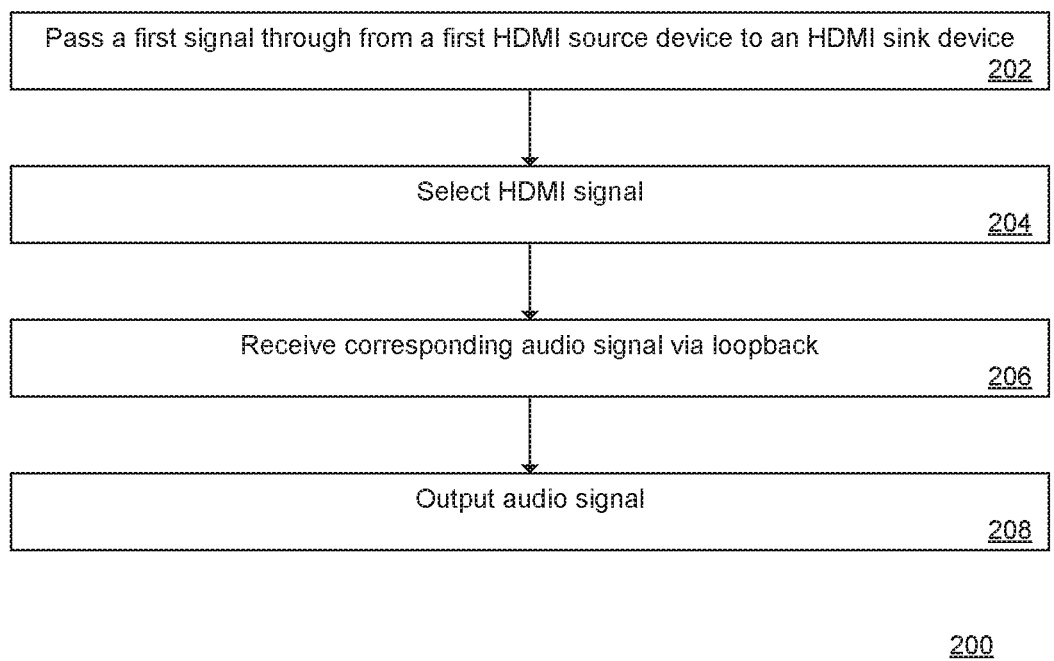
FIG. 2 is a flowchart of a method 200 of connecting HDMI devices.

FIG. 2 is a flowchart of a method 200 of connecting HDMI devices. The method 200 may be performed by one or more components of the audio/video system 100 (see FIG. 1, e.g. the loopback device 108), for example according to a computer program executed by a processor.

At 202, a loopback device passes a first signal through from a first HDMI source device to an HDMI sink device via a first HDMI connection. For example, in FIG. 1 the loopback device 108 passes HDMI signals through from the second source device 104 to the sink device 106. Once the various HDMI devices have been physically connected, they make HDMI connections using the various features of the HDMI protocol (e.g., using the Display Data Channel (DDC), the Consumer Electronics Control (CEC) channel, the HDMI Ethernet and Audio Return Channel (HEAC), the Enhanced Audio Return Channel (eARC), etc.).

As discussed in more detail below, the loopback device 108 (see FIG. 1) is configured to make this HDMI connection in a pass through manner. In general, the HDMI connection includes a transition-minimized differential signaling (TMDS) or fixed-rate link (FRL) channel, and the loopback device 108 passes through the signals on the TMDS or FRL channel from the second source device 104 to the sink device 106. (The FRL channel uses the same wires as the TMDS channel, but instead of one clock pair and three data pairs, the FRL channel uses all four pairs for data, with an embedded clock. The following discussion refers specifically to the TMDS channel, but applies equally to the FRL channel.)

At 204, the HDMI sink device selects a signal, where the selected signal is one of a number of signals including the first signal from the first HDMI source device via the first HDMI connection and a second signal from the second HDMI source device via a second HDMI connection. For example, in FIG. 1 the sink device 106 selects (e.g., according to a user input) the signal from one of the first source device 102 and the second source device 104. As a further example, if an HDTV (the sink device 106) is connected to a Blu-ray™ device (the source device 102) and a set-top box (the source device 104), the HDTV may switch among the signals from those devices for display. The second HDMI connection differs from the first HDMI connection. For example, in FIG. 1 the second source device 104 has a first HDMI connection with the sink device 106 using the loopback device 108, and the first source device 102 has a second HDMI connection with the sink device 106.

At 206, the loopback device receives, via loopback from the HDMI sink device, a selected audio signal. The selected audio signal corresponds to the selected signal, as selected by the HDMI sink device (see 204). For example, in FIG. 1 the loopback device 108 receives the selected audio signal from the sink device 106, according to the selected signal (see 204). As discussed in more detail below, the HDMI sink device may use the HDMI ARC or eARC for sending the audio signal to the loopback device.

At 208, the loopback device outputs the selected audio signal to a speaker. For example, in FIG. 1 the loopback device 108 outputs the selected audio signal to the speaker 110 via a wired or wireless connection. The speaker 110 then outputs the selected audio signal.

Figure 3:
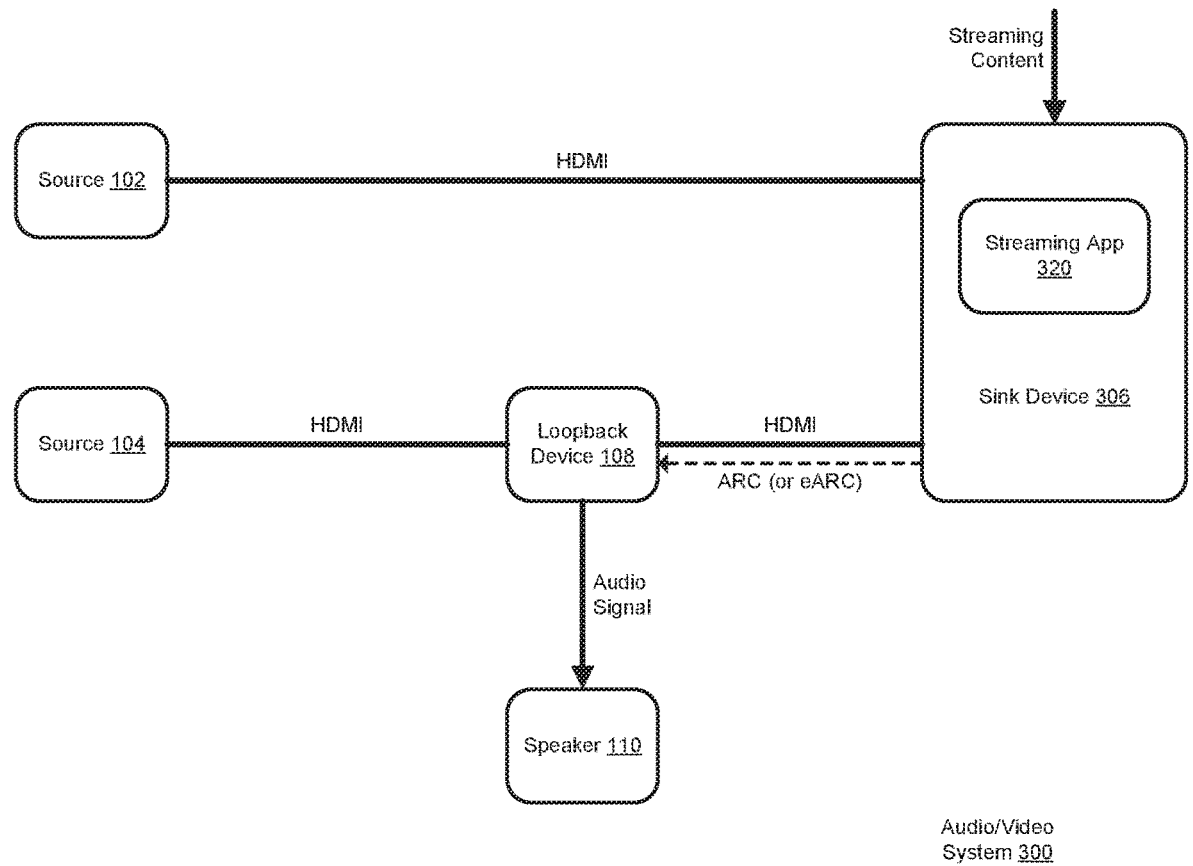
FIG. 3 is a block diagram of an audio/video system 300.

FIG. 3 is a block diagram of an audio/video system 300. The audio/video system 300 is similar to the audio/video system 100 (see FIG. 1), with the added feature of the sink device 306 including a streaming app 320. The sink device 306 may also include another connection (e.g., to the Internet via a router or other device) for receiving streaming content for the streaming app 320. The sink device 306 is otherwise similar to the sink device 106 (see FIG. 1).

The operation of the audio/video system 300 is similar to that described above with reference to the method 200 of FIG. 2. One modification is that at 204, the selected signal may include a third signal from the streaming app 320. Another modification is that at 206, the selected audio signal may correspond to the third signal from the streaming app 320.

Similarly to the audio/video system 100 (see FIG. 1), the audio/video system 300 differs from traditional systems in that since the loopback device 108 passes the HDMI signals through, the user is not required to upgrade the loopback device 108 when the source device 102 and the sink device 306 are upgraded to a new HDMI version.

Figure 4:
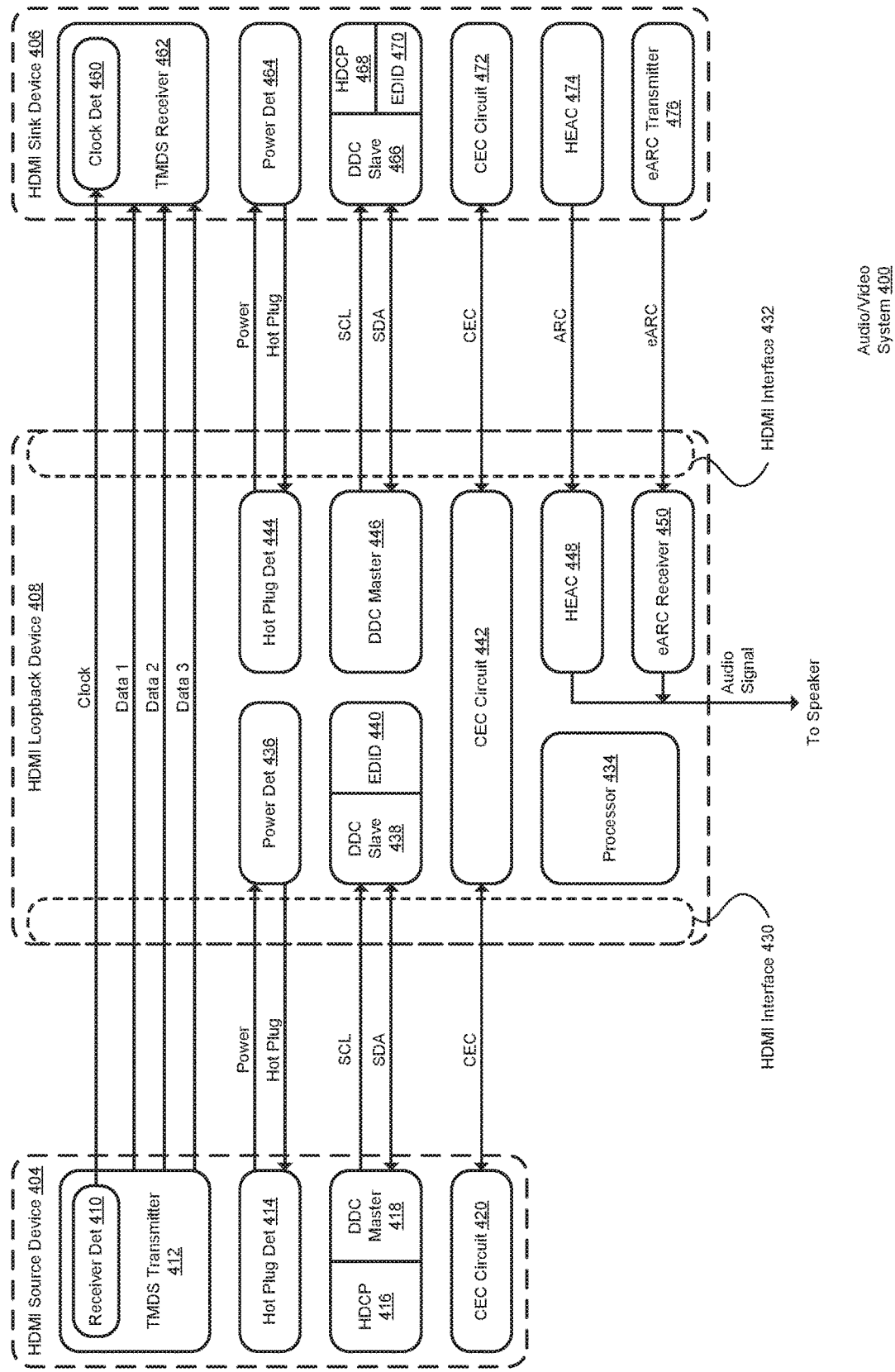
FIG. 4 is a block diagram of an audio/video system 400.

FIG. 4 is a block diagram of an audio/video system 400. The audio/video system 400 shows more details for the source device, the loopback device and the sink device (see FIG. 1, FIG. 2, FIG. 3, etc.). The audio/video system 400 includes an HDMI source device 404, an HDMI sink device 406, and an HDMI loopback device 408. Each of the devices may include a processor that controls its operation, for example according to a computer program executed by the processor.

The HDMI source device 404 generally provides an HDMI signal, and generally corresponds to the second source device 104 (see FIG. 1). As shown in FIG. 4, the HDMI source device 404 provides the HDMI signal via a connection to the HDMI loopback device 408, with the TMDS signals being passed through the HDMI loopback device 408 to the HDMI sink device 406 (as further discussed below). The HDMI source device 404 includes a receiver detection circuit 410, a TMDS transmitter circuit 412, a hot plug detection circuit 414, a High-bandwidth Digital Content Protection (HDCP) circuit 416, a DDC master circuit 418, and a CEC circuit 420. (The HDMI source device 404 may also include other components, such as a processor and a memory (e.g., that control its operation); for brevity, the details of these other components are omitted.)

The receiver detection circuit 410 generates and outputs a clock signal "Clock". The clock signal is a TMDS clock signal output using three pins (e.g., pin 10 for Clock+, pin 11 for Clock Shield, and pin 12 for Clock−).

The TMDS transmitter circuit 412 generates and outputs three data signals, "Data 1", "Data 2" and "Data 3". These data signals are TMDS signals, each output using three pins (e.g., pins 7-9 for Data1+, Data1 Shield and Data1−; pins 4-6 for Data2+, Data2 Shield and Data2−; and pins 1-3 for Data3+, Data3 Shield and Data3−).

The hot plug detection circuit 414 performs hot plug detection (e.g., using pin 19). When the source device 404 is powered on or is connected to a sink device (here, the HDMI loopback device 408) with an HDMI cable, a Hot-Plug Detect (HPD) event is initiated. During the initiation sequence, the HDMI source device 404 reads the EDID information from the sink (here, the HDMI loopback device 408) over the DDC line (discussed in more detail below) and negotiates a format/resolution for the data in the TMDS signals. The hot plug detection circuit 414 also provides a voltage (5 volts as shown, using pin 18).

The HDCP circuit 416 works with the DDC master circuit 418 to perform HDCP. In general, the when the sink device requires HDCP, the HDCP circuit 416 works with the DDC master circuit 418 to communicate this information, in order for the HDMI source device 404 to encrypt the data in the TMDS signals.

The DDC master circuit 418 generates a serial clock signal "SCL" (e.g., using pin 15) and communicates a serial data signal "SDA" (e.g., using pin 16). These serial signals are I²C (Inter-Integrated Circuit) signals. As mentioned above, the DDC master circuit 418 exchanges HDCP-related information with other devices (e.g., the HDMI sink device 406, the HDMI loopback device 408, etc.). The DDC master circuit 418 also reads E-EDID data from other connected devices (e.g., the HDMI sink device 406) to learn what audio/video formats the other device can take. The DDC master circuit 418 may also exchange other information on the DDC channel with other connected devices.

The CEC circuit 420 generally implements CEC functionality (e.g., using pin 13). In general, CEC allows a user to command and control up to 15 CEC-enabled devices, that are connected through HDMI, by using only one of their remote controls.

Note that the TMDS signals (Clock, Data 1, Data 2 and Data 3) are passed through the HDMI loopback device 408 to the HDMI sink device 406; the other signals (e.g., SCL, SDA, etc.) are exchanged with the HDMI loopback device 408. Further features of the pass-through, and further features of the other signals, are discussed in more detail below.

The HDMI loopback device 408 generally connects between the HDMI source device 404 and the HDMI sink device 406, and generally corresponds to the loopback device 108 (see FIG. 1). The HDMI loopback device 408 includes an HDMI interface 430 that connects (e.g., using an HDMI cable) to the HDMI source device 404, and HDMI interface 432 that connects (e.g., using an HDMI cable) to the HDMI sink device 406, and a processor 434 that generally controls the operation of the HDMI loopback device 408. As mentioned above, the HDMI interface 430 may be in the form of a 19-pin HDMI male connector; the HDMI interface 432 may be in the form of a 19-pin HDMI female connector on a short HDMI cable (giving the HDMI loopback device 408 the form factor of a dongle), or a 19-pin HDMI male connector that is connectable to the HDMI sink device 406 using an HDMI cable. Alternatively in a soundbar implementation, the HDMI interfaces 430 and 432 may be HDMI female connectors. The HDMI loopback device 408 also includes a power detection circuit 436, a DDC slave circuit 438, an EDID circuit 440, a CEC circuit 442, a hot plug detection circuit 444, a DDC master circuit 446, a HEAC circuit 448, and an eARC receiver circuit 450.

The power detection circuit 436 receives a voltage from the HDMI source device 404 (e.g., from the hot plug detection circuit 414) and communicates the HPD event back to the hot plug detection circuit 414. In this manner, the HDMI loopback device 408 communicates the fact of its connection to the HDMI source device 404.

The DDC master circuit 418 (in the HDMI source device 404) communicates with the DDC slave circuit 438 using the serial data signal SDA over the DDC link. As discussed above, this data may include HDCP-related information, E-EDID data, and other information. The DDC slave circuit 438 also receives the serial clock signal SCL (from the HDMI source device 404) over the DDC link.

The EDID circuit 440 works with the DDC master circuit 446 to obtain the E-EDID data from the HDMI sink device 406, and works with the DDC slave circuit 438 to communicate the obtained and modified E-EDID data to the HDMI source device 404. In this manner, the HDMI source device 404 becomes aware of the capabilities of the HDMI sink device 406.

The CEC circuit 442 generally implements CEC functionality (e.g., using pin 13). The CEC circuit 442 communicates with the CEC circuit 420 in the HDMI source device 404, and with a corresponding CEC circuit in the HDMI sink device 406, in order to transfer CEC information among the various connected devices.

The hot plug detection circuit 444 performs hot plug detection (e.g., using pin 19). When the source device 404 is powered on or is connected to a sink device (here, the HDMI sink device 406) with an HDMI cable, a Hot-Plug Detect (HPD) event is initiated. During the initiation sequence, the HDMI loopback device 408 reads the EDID information from the sink (here, the HDMI sink device 406) over the DDC line (discussed in more detail below) and passes this information on to the HDMI source device 404 for it to negotiate a format/resolution for the data in the TMDS signals. The hot plug detection circuit 444 also provides a voltage (5 volts as shown, using pin 18).

The DDC master circuit 446 generates a serial clock signal "SCL" (e.g., using pin 15) and communicates a serial data signal "SDA" (e.g., using pin 16). These serial signals are I²C (Inter-Integrated Circuit) signals. As mentioned above, the DDC master circuit 446 exchanges HDCP-related information with other devices (e.g., the HDMI sink device 406). The DDC master circuit 446 also reads E-EDID data from other connected devices (e.g., the HDMI sink device 406) to learn what audio/video formats the other device can take. The DDC master circuit 446 may also exchange other information on the DDC channel with other connected devices. In this manner, the HDMI loopback device 408 communicates the HDCP-related information and the E-EDID data between the HDMI source device 404 and the HDMI sink device 406.

The HEAC circuit 448 generally receives an audio signal from the HDMI sink device 406 on the audio return channel (ARC), and provides the audio signal to a speaker (e.g., the speaker 110 of FIG. 1). If the HDMI loopback device 408 is receiving only an ARC transmission, a single mode signal using the HEAC+ line (e.g., pin 14) can be used; otherwise, HEC is transmitted as a differential signal over the pair of lines (e.g., both HEAC+ on pin 14 and HEAC− on pin 19), and ARC as a common mode component of the pair.

The eARC receiver circuit 450 generally receives an audio signal from the HDMI sink device 406 on the enhanced audio return channel (eARC), and provides the audio signal to a speaker (e.g., the speaker 110 of FIG. 1). eARC is similar to ARC, but the connection for eARC uses two pins and a shield twisted pair for Ethernet. In addition, the eARC receiver circuit 450 may perform discovery independently of the CEC circuit 442 (whereas ARC interacts with the CEC circuit 442 to perform discovery).

As mentioned above, the HDMI loopback device 408 passes the TMDS signals (Clock, Data 1, Data 2 and Data 3) through from the HDMI source device 404 to the HDMI sink device 406; the other signals (e.g., SCL, SDA, etc.) are exchanged between the HDMI source device 404 and the HDMI loopback device 408, and between the HDMI loopback device 408 and the HDMI sink device 406. In general, "pass through" means that the HDMI loopback device 408 operates similarly to an HDMI cable with respect to the TMDS signals, for example without modifying the TMDS signals, without using active components to retransmit the TMDS signals, etc.

The HDMI sink device 406 generally receives an HDMI signal (and transmits ARC or eARC signals, as discussed above), and generally corresponds to the sink device 106 (see FIG. 1). As shown in FIG. 4, the HDMI sink device 406 receives the HDMI signal via a connection to the HDMI loopback device 408, with the TMDS signals being passed through the HDMI loopback device 408 from the HDMI source device 404; and the HDMI sink device 406 transmits ARC (or eARC) signals to the HDMI loopback device 408. The HDMI sink device 406 includes a clock detection circuit 460, a TMDS receiver circuit 462, a power detection circuit 464, a DDC slave circuit 466, a HDCP circuit 468, an EDID circuit 470, a CEC circuit 472, a HEAC circuit 474, and (optionally) an eARC transmitter circuit 476. (The HDMI sink device 406 may also include other components, such as a processor and a memory (e.g., that control its operation); for brevity, the details of these other components are omitted.)

The clock detection circuit 460 receives the clock signal "Clock". As discussed above, the clock signal is a TMDS clock signal received using three pins.

The TMDS receiver circuit 462 receives the data signals "Data 1", "Data 2" and "Data 3". As discussed above, these data signals are TMDS signals, each received using three pins.

The power detection circuit 464 receives a voltage from the HDMI loopback device 408 (e.g., from the hot plug detection circuit 444) and communicates the HPD event back to the hot plug detection circuit 444. In this manner, the HDMI sink device 406 communicates the fact of its connection to the HDMI loopback device 408.

The DDC slave circuit 466 communicates with the DDC master circuit 446 (in the HDMI loopback device 408) using the serial data signal SDA over the DDC link. As discussed above, this data may include HDCP-related information, E-EDID data, and other information. The DDC slave circuit 466 also receives the serial clock signal SCL (from the HDMI loopback device 408) over the DDC link.

The HDCP circuit 468 works with the DDC slave circuit 466 to provide the HDCP information to the HDMI loopback device 408. (The HDMI loopback device 408 then passes the HDCP information on to the HDMI source device 404, as discussed above.)

The EDID circuit 470 works with the DDC slave circuit 466 to provide the E-EDID data from the HDMI sink device 406 to the HDMI loopback device 408.

The CEC circuit 472 generally implements CEC functionality (e.g., using pin 13). The CEC circuit 472 communicates with the CEC circuit 442 in the HDMI loopback device 408, and with the CEC circuit 420 in the HDMI source device 404, in order to transfer CEC information among the various connected devices.

The HEAC circuit 474 generally transmits an audio signal on the ARC to the HDMI loopback device 408, as discussed above.

The eARC transmitter circuit 476 generally transmits an audio signal on the eARC to the HDMI loopback device 408, as discussed above.

The operation of the HDMI source device 404, the HDMI sink device 406, and the HDMI loopback device 408 is detailed below with reference to FIG. 5.

Figure 5:
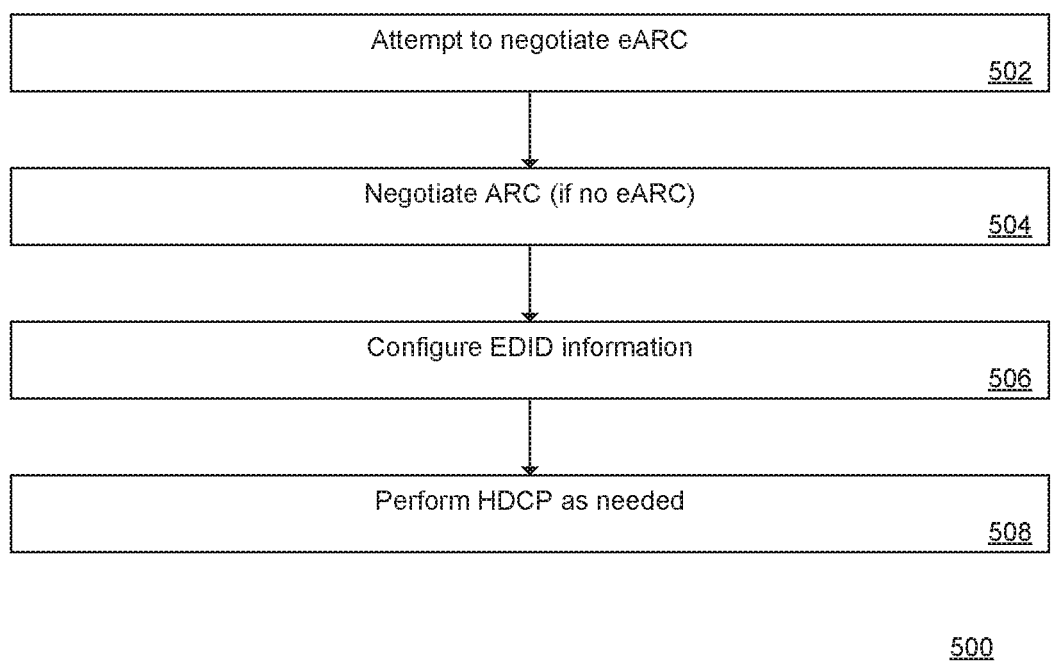
FIG. 5 is a flowchart of a method 500 of connecting HDMI devices.

FIG. 5 is a flowchart of a method 500 of connecting HDMI devices. The method 500 may be performed by one or more components of the audio/video system 400 (see FIG. 4, e.g. the HDMI loopback device 408 and the other devices), for example according to a computer program executed by a processor.

At 502, the HDMI loopback device 408 attempts to negotiate eARC with the HDMI sink device 406, using the common mode data channel of eARC. For example, the HDMI loopback device 408 uses the eARC receiver circuit 450, and the HDMI sink device 406 uses the eARC transmitter circuit 476, to negotiate eARC.

At 504, if the devices fail to negotiate eARC, the HDMI loopback device 408 negotiates ARC with the HDMI sink device 406 over the CEC link. For example, the HDMI loopback device 408 uses the CEC circuit 442 to communicate with the CEC circuit 472 in the HDMI sink device 406.

At 506, the HDMI loopback device 408 configures its EDID information. First, the HDMI loopback device 408 propagates power and hot plug information in a controlled way. For example, the HDMI loopback device 408 uses the power detection circuit 436 to propagate power and hot plug information with the HDMI source device 404, and uses the hot plug detection circuit 444 to propagate power and hot plug information with the HDMI sink device 406.

Second, the HDMI loopback device 408 receives an individual HDMI physical address (PhysAddr) from the EDID of the HDMI sink device 406. To read the EDID, the HDMI loopback device 408 uses the DDC master circuit 446 to communicate with the DDC slave circuit 466 of the HDMI sink device 406. The DDC bus does not allow for multiple I²C masters, so the HDMI loopback device 408 maintains two independent DDC buses, one to the HDMI sink device 406 (using the DDC master circuit 446) and one to the HDMI source device 404 (using the DDC slave circuit 438).

Third, the HDMI loopback device 408 generates a modified EDID and provides the modified EDID to the HDMI source device 404, in order to propagate the HDMI PhysAddr to the HDMI source device 404. More details of the process of generating the modified EDID are provided below.

As mentioned above, the HDMI loopback device 408 includes a DDC repeater (the DDC master circuit 446 and the DDC slave circuit 438), which are used when modifying the HDMI physical address of the HDMI sink device 406. The HDMI loopback device 408, as an active participant on the CEC bus, takes its HDMI PhyAddr from the sink device's EDID, then modifies it for the downstream source device, and makes that available in its own EDID. For example, if the HDMI sink device 406 provides a PhysAddr of 2.0.0.0, the HDMI loopback device 408 may put 2.1.0.0 into the EDID for the source device.

More specifically, first the HDMI loopback device 408 reads all of the EDID data from the HDMI sink device 406. Second, the HDMI loopback device 408 locates the HDMI Vendor Specific Data Block (HDMI VSDB) within the CTA (Consumer Technology Association) Data Block Collection of a CTA Extension Block version 3 (CTA Data Block of Type 3 with an IEEE identifier of 0x000C03). Third, the HDMI loopback device 408 extracts the two bytes holding the HDMI Physical Address (at offset 4 of the VSDB). Fourth, the HDMI loopback device 408 splits the two bytes (e.g. 0x10 0x00) into the 4 numbers representing the HDMI Physical Address (e.g. 1.0.0.0). This will be used by the CEC circuit 442 of the HDMI loopback device 408. Fifth, the HDMI loopback device 408 amends the physical address by incrementing the first number that is zero (e.g. 1.1.0.0). Sixth, the HDMI loopback device 408 encodes the new address into two bytes (e.g. 0x11 0x00) and inserts into the EDID data at the same offset, overwriting the old physical address. Finally, the HDMI loopback device 408 calculates a new checksum for the EDID block, and makes the new EDID data available to the source via the EDID circuit 440.

At 508, the HDMI loopback device 408 performs HDCP functionality as needed. As part of this process, the HDMI loopback device 408 receives HDCP-related messages on the SDA link from the HDMI source device 404 (e.g., using the DDC slave circuit 438), and passes them on to the HDMI sink device 406 (e.g., using the DDC master circuit 446 and the corresponding SDA link). For example, the HDMI loopback device 408 passes on the 44-byte HDCP 2.2 locality check in 20 msec.

Device Specifications

The HDMI loopback device (e.g., the loopback device 108 of FIG. 1, the HDMI loopback device 408 of FIG. 4, etc.) may be implemented using a microcontroller, an interrupt-driven I²C and CEC implementation, an I²C master implementation, and 4 general-purpose input/output (GPIO) pins to detect and control voltages on the Hot Plug and Power lines. These features drive the following electrical requirements:

For TMDS, the pass-through is passive (as discussed above), similar to a straight cable. The requirements may be as described in HDMI 1.4b, Sections 4.2.1 through 4.2.6, and in HDMI 2.0b, Section 6.1.1.

For power, 5 Volts may be provided, as described in HDMI 1.4b, Section 4.2.7. Power out to the HDMI sink device may be between 4.8 and 5.3 Volt, and greater than or equal to 55 mA.

For DDC, the I²C bus may operate at 100 kHz, as described in HDMI 1.4b, Section 4.2.8. The transmitter (e.g., the DDC master circuit 446, connecting to the HDMI sink device) may have a capacitance of 50 pF, and pull-up resistors with a resistance between 1.5 and 2.0 kOhm. The receiver (e.g., the DDC slave circuit 438, connecting to the HDMI source device) may have a capacitance of 50 pF, and pull-up resistors with a resistance of 47 kOhm (+/−10%).

For hot plug detection, 5 Volts may be provided, as described in HDMI 1.4b, Section 4.2.9. The transmitter (e.g., the hot plug detection circuit 444) may operate using between 0 to 0.4 Volt for low, 2.4 to 5.3 Volt for high, at a resistance of 1000 Ohm (+/−20%).

For CEC, the CEC circuit 442 may conform to HDMI 1.4b, Section 4.2.10, with 5 ohms max through, power-off leakage no more than 1.8 uA, and a maximum capacitance of 150 pF.

For ARC (or utility), the HEAC circuit 448 may conform to HDMI 1.4b, Section 4.2.11, with a maximum impedance of 55 Ohm (+1-35%), and a Dolby® Digital Plus bandwidth of 25 MHz.

For eARC, the eARC receiver 450 may conform to HDMI 2.1, Section 9.5. The electrical specifications may be as described for HEC (Ethernet) in HDMI 1.4b, Section HEAC 2.5. The Utility/HPD lines are implemented as a shielded pair carrying a differential signal at +/−0.2 Volt (+/−10%) and at 125 MHz.

All of the control lines may be implemented using 5 Volt or 3.3 Volt GPIO pins, with some external circuitry. The ARC line may be connected to a 192 kHz-capable S/PDIF (Sony/Philips Digital Interface Format) input pin. The eARC implementation may include an I²S (Inter-IC Sound) interface with 4 data lines, at up to 192 kHz. The CEC line and the DDC busses may be connected to hardware blocks implementing the low-level protocol functionality; alternatively, raw GPIOs with interrupt request (IRQ) may also be used. The DDC master circuit 446 may be implemented with a source-controlled clock, at up to 100 kHz respective kbit/s, having no IRQ requirement. The DDC slave circuit 438 may be implemented with an externally initiated clock, but the slave can hold the clock if it is too slow to respond (clock stretching); there is an IRQ requirement for the clock line, but no IRQ for the data line. The CEC circuit 442 may be a multi-node implementation, with a single wire transmitter and receiver with collision detection; it may operate slowly, nominally at 4.5 ms per bit (222 bit/second), with IRQ optional, and may perform polling (depending upon the speed of the processor). The power detection circuit 436 and hot plug detection circuit 444 may perform sampling at up to 100 ms granularity, with no IRQ required.

Form Factor Options

The loopback device (e.g., the loopback device 108 of FIG. 1, etc.) may be in the form factor of a dongle, with a male HDMI connector at one end for connecting to the second source device 104 via an HDMI cable, and a female connector at the other end (optionally on a short HDMI cable) for connecting to the sink device 106 (or a male connector, for connecting to the sink device 106 via another HDMI cable).

Alternatively, the loopback device may be in the form factor of a soundbar, with no requirement to connect to additional external speakers (such as the speaker 110 of FIG. 1).

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Various aspects of the present invention may be appreciated from the following enumerated example embodiments (EEEs):

1. An apparatus for connecting High-Definition Multimedia Interface (HDMI) devices, the apparatus comprising:
   a first HDMI interface that is configured to connect to a first HDMI source device;
   a second HDMI interface that is configured to connect to an HDMI sink device; and
   a processor,
   wherein the processor is configured to control the apparatus to pass a first signal through from the first HDMI source device to the HDMI sink device via a first HDMI connection,
   wherein the HDMI sink device is configured to select a selected signal, wherein the selected signal is one of a plurality of signals including the first signal from the first HDMI source device via the first HDMI connection and a second signal from a second HDMI source device via a second HDMI connection, wherein the second HDMI connection differs from the first HDMI connection,
   wherein the processor is configured to control the apparatus to control the apparatus to receive, via loopback from the HDMI sink device, a selected audio signal, wherein the selected audio signal corresponds to the selected signal, as selected by the HDMI sink device, and
   wherein the processor is configured to control the apparatus to output the selected audio signal to a speaker.

2. The apparatus of EEE 1, wherein the first HDMI connection includes a source connection and a sink connection, wherein the selected audio signal is received from the HDMI sink device via an audio return channel (ARC) of the sink connection.

3. The apparatus of EEE 1, wherein the first HDMI connection includes a source connection and a sink connection, wherein the selected audio signal is received from the HDMI sink device via an enhanced audio return channel (eARC) of the sink connection.

4. The apparatus of EEE 1, wherein the selected audio signal is associated with the second HDMI connection, and wherein the selected audio signal is received from the HDMI sink device via an audio return channel (ARC) of the first HDMI connection.

5. The apparatus of EEE 1, wherein the selected audio signal corresponds to one of a first audio signal associated with the first signal, a second audio signal associated with the second signal, and a third audio signal associated with a third signal, as selected by the HDMI sink device, wherein the third audio signal is associated with a different source than the first HDMI source device and the second HDMI source device, and wherein the selected audio signal is received from the HDMI sink device via an audio return channel (ARC) of the first HDMI connection.

6. The apparatus of EEE 1, wherein the selected audio signal corresponds to one of a first audio signal associated with the first signal, a second audio signal associated with the second signal, and a third audio signal associated with a third signal, as selected by the HDMI sink device, wherein the third audio signal is associated with a different source than the first HDMI source device and the second HDMI source device, wherein the selected audio signal corresponds to the third audio signal, and wherein the selected audio signal is received from the HDMI sink device via an audio return channel (ARC) of the first HDMI connection.

7. The apparatus of EEE 1, wherein the first HDMI interface and the second HDMI interface include a transition-minimized differential signaling (TMDS) channel, wherein the apparatus is configured to pass the first signal through from the first HDMI source device to the HDMI sink device on the TMDS channel.

8. The apparatus of EEE 1, wherein the first HDMI interface and the second HDMI interface include a transition-minimized differential signaling (TMDS) channel, wherein the apparatus is configured to pass the first signal through from the first HDMI interface to the second HDMI interface on the TMDS channel.

9. The apparatus of EEE 1, wherein the first HDMI interface and the second HDMI interface include a transition-minimized differential signaling (TMDS) channel, wherein the first HDMI interface is configured to receive the first signal from the first HDMI source device, wherein the apparatus is configured to pass the first signal through from the first HDMI interface to the second HDMI interface on the TMDS channel, and wherein the second HDMI interface is configured to send the first signal to the HDMI sink device.

10. The apparatus of EEE 1, wherein the first HDMI interface and the second HDMI interface include a fixed-rate link (FRL) channel, wherein the apparatus is configured to pass the first signal through from the first HDMI source device to the HDMI sink device on the FRL channel.

11. The apparatus of EEE 1, wherein the processor is configured to control the apparatus to receive a physical address from an Extended Display Identification Data (EDID) of the HDMI sink device, to generate a modified EDID, and to provide the modified EDID to the HDMI source device, and
   wherein the HDMI source device is configured to use the modified EDID instead of the EDID to generate the first signal.

12. The apparatus of EEE 1, wherein the apparatus has a form factor of a dongle.

13. The apparatus of EEE 1, wherein the apparatus has a form factor of a soundbar that includes the speaker.

14. A method of connecting High-Definition Multimedia Interface (HDMI) devices, the method comprising:
   passing through, by a loopback device, a first signal from a first HDMI source device to an HDMI sink device via a first HDMI connection;
   selecting, by the HDMI sink device, a selected signal, wherein the selected signal is one of a plurality of signals including the first signal from the first HDMI source device via the first HDMI connection and a second signal from a second HDMI source device via a second HDMI connection, wherein the second HDMI connection differs from the first HDMI connection;
   receiving, by the loopback device from the HDMI sink device via loopback, a selected audio signal, wherein the selected audio signal corresponds to the selected signal, as selected by the HDMI sink device; and
   outputting, by the loopback device, the selected audio signal to a speaker.

15. The method of EEE 14, wherein the first HDMI connection includes a source connection and a sink connection, wherein the selected audio signal is received from the HDMI sink device via an audio return channel (ARC) of the sink connection.

16. The method of EEE 14, wherein the first HDMI connection includes a source connection and a sink connection, wherein the selected audio signal is received from the HDMI sink device via an enhanced audio return channel (eARC) of the sink connection.

17. The method of EEE 14, wherein the first HDMI connection includes a transition-minimized differential signaling (TMDS) channel, wherein the first signal is passed from the first HDMI source device through to the HDMI sink device on the TMDS channel.

18. The method of EEE 14, wherein the first HDMI connection includes a fixed-rate link (FRL) channel, wherein the first signal is passed from the first HDMI source device through to the HDMI sink device on the FRL channel.

19. The method of EEE 14, further comprising:
receiving, by the loopback device, a physical address from an Extended Display Identification Data (EDID) of the HDMI sink device;
generating, by the loopback device, a modified EDID; and
providing, by the loopback device, the modified EDID to the HDMI source device, wherein the HDMI source device is configured to use the modified EDID instead of the EDID to generate the first signal.

20. A system for connecting High-Definition Multimedia Interface (HDMI) devices, the system comprising:
a first HDMI source device;
a second HDMI source device;
an HDMI sink device;
a speaker; and
a loopback device, wherein the loopback device includes:
a first HDMI interface that is configured to connect to the first HDMI source device;
a second HDMI interface that is configured to connect to the HDMI sink device; and
a processor,
wherein the processor is configured to control the loopback device to pass a first signal through from the first HDMI source device to the HDMI sink device via a first HDMI connection,
wherein the HDMI sink device is configured to select a selected signal, wherein the selected signal is one of a plurality of signals including the first signal from the first HDMI source device via the first HDMI connection and a second signal from a second HDMI source device via a second HDMI connection, wherein the second HDMI connection differs from the first HDMI connection,
wherein the processor is configured to control the loopback device to control the apparatus to receive, via loopback from the HDMI sink device, a selected audio signal, wherein the selected audio signal corresponds to the selected signal, as selected by the HDMI sink device, and
wherein the processor is configured to control the loopback device to output the selected audio signal to a speaker.

The invention claimed is:

1. An apparatus including a loopback device for connecting High-Definition Multimedia Interface (HDMI) devices, the loopback device comprising:
a first HDMI interface that is configured to connect to a first HDMI source device;
a second HDMI interface that is configured to connect to an HDMI sink device; and
a processor,
wherein the processor is configured to control the loopback device to pass a first HDMI signal through from the first HDMI source device to the HDMI sink device via a first HDMI connection,
wherein the HDMI sink device is configured to select a selected HDMI signal, wherein the selected HDMI signal is one of the first HDMI signal from the first HDMI source device via the first HDMI connection, and a second HDMI signal from a second HDMI source device via a second HDMI connection, wherein the second HDMI connection does not connect to the, loopback device,
wherein the processor is configured to control the loopback device to receive, via the second HDMI interface from the HDMI sink device, a selected audio signal associated with the selected HDMI signal, and
wherein the processor is configured to control the loopback device to output the selected audio signal to a speaker.

2. The apparatus of claim 1, wherein the first HDMI connection includes a source connection and a sink connection, wherein the selected audio signal is received from the HDMI sink device via an audio return channel (ARC) of the sink connection.

3. The apparatus of claim 1, wherein the first HDMI connection includes a source connection and a sink connection, wherein the selected audio signal is received from the HDMI sink device via an enhanced audio return channel (eARC) of the sink connection.

4. The apparatus of claim 1, wherein the selected audio signal is associated with the second HDMI connection, and wherein the selected audio signal is received from the HDMI sink device via an audio return channel (ARC) of the first HDMI connection.

5. The apparatus of claim 1, wherein the selected audio signal corresponds to one of a first audio signal associated with the first HDMI signal, a second audio signal associated with the second signal, and a third audio signal associated with a third signal, as selected by the HDMI sink device, wherein the third audio signal is associated with a different source than the first HDMI source device and the second HDMI source device, and wherein the selected audio signal is received from the HDMI sink device via an audio return channel (ARC) of the first HDMI connection.

6. The apparatus of claim 1, wherein the selected audio signal corresponds to one of a first audio signal associated with the first HDMI signal, a second audio signal associated with the second HDMI signal, and a third audio signal associated with a third signal, as selected by the HDMI sink device, wherein the third audio signal is associated with a different source than the first HDMI source device and the second HDMI source device, wherein the selected audio signal corresponds to the third audio signal, and wherein the selected audio signal is received from the HDMI sink device via an audio return channel (ARC) of the first HDMI connection.

7. The apparatus of claim 1, wherein the first HDMI interface and the second HDMI interface include a transition-minimized differential signaling (TMDS) channel, wherein the loopback device is configured to pass the first HDMI signal through from the first HDMI source device to the HDMI sink device on the TMDS channel.

8. The apparatus of claim 1, wherein the first HDMI interface and the second HDMI interface include a transition-minimized differential signaling (TMDS) channel, wherein the loopback device is configured to pass the first HDMI signal through from the first HDMI interface to the second HDMI interface on the TMDS channel.

9. The apparatus of claim 1, wherein the first HDMI interface and the second HDMI interface include a transition-minimized differential signaling (TMDS) channel, wherein the first HDMI interface is configured to receive the first HDMI signal from the first HDMI source device, wherein the loopback device is configured to pass the first HDMI signal through from the first HDMI interface to the second HDMI interface on the TMDS channel, and wherein the second HDMI interface is configured to send the first HDMI signal to the HDMI sink device.

10. The apparatus of claim 1, wherein the first HDMI interface and the second HDMI interface include a fixed-rate link (FRL) channel, wherein the loopback device is configured to pass the first HDMI signal through from the first HDMI source device to the HDMI sink device on the FRL channel.

11. The apparatus of claim 1, wherein the processor is configured to control the loopback device to receive a physical address from an Extended Display Identification Data (EDID) of the HDMI sink device, to generate a modified EDID, and to provide the modified EDID to the HDMI source device, and
wherein the HDMI source device is configured to use the modified EDID instead of the EDID to generate the first HDMI signal.

12. The apparatus of claim 1, wherein the loopback device has a form factor of a dongle.

13. The apparatus of claim 1, wherein the loopback device has a form factor of a soundbar that includes the speaker.

14. A method of connecting High-Definition Multimedia Interface (HDMI) devices, the method comprising:
passing through, by a loopback device, a first HDMI signal from a first HDMI source device to an HDMI sink device via a first HDMI connection;
selecting, by the HDMI sink device, a selected HDMI signal, wherein the selected HDMI signal is one of the first HDMI signal from the first HDMI source device via the first HDMI connection and a second HDMI signal from a second HDMI source device via a second HDMI connection, wherein the second HDMI connection does not connect to the; loopback device;
receiving, by the loopback device from the HDMI sink device via loopback, a selected audio signal associated with the selected HDMI signal; and
outputting, by the loopback device, the selected audio signal to a speaker.

15. A system for connecting High-Definition Multimedia Interface (HDMI) devices, the system comprising:
a first HDMI source device;
a second HDMI source device;
an HDMI sink device;
a speaker; and
a loopback device, wherein the loopback device includes:
a first HDMI interface that is configured to connect to the first HDMI source device;
a second HDMI interface that is configured to connect to the HDMI sink device; and
a processor,
wherein the processor is configured to control the loopback device to pass a first HDMI signal through from the first HDMI source device to the HDMI sink device via a first HDMI connection,
wherein the HDMI sink device is configured to select a selected HDMI signal, wherein the selected HDMI signal is one of the first HDMI signal from the first HDMI source device via the first HDMI connection and a second HDMI signal from a second HDMI source device via a second HDMI connection, wherein the second HDMI connection does not connect to the loopback device,
wherein the processor is configured to control the loopback device to receive, via the second HDMI interface from the HDMI sink device, a selected audio signal associated with the selected audio and video signal, wherein the selected audio signal corresponds to the selected HDMI signal, as selected by the HDMI sink device, and
wherein the processor is configured to control the loopback device to output the selected audio signal to a speaker.

16. The apparatus of claim 1, wherein the loopback device passes the first HDMI signal through as a passive pass-through.

17. The apparatus of claim 1, wherein the loopback device passes the first HDMI signal through without modifying the first HDMI signal.

18. The apparatus of claim 1, wherein the loopback device passes the first HDMI signal through without using active components to retransmit the first HDMI signal.

19. The apparatus of claim 1, wherein the first HDMI signal includes transition-minimized differential signaling (TMDS) signals, wherein the loopback device passes the TMDS signals through without using active components to retransmit the TMDS signals.

20. The apparatus of claim 1, wherein the first HDMI signal includes a transition-minimized differential signaling (TMDS) signal and an other signal, wherein the loopback device passes the TMDS signal through without using active components to retransmit the TMDS signal, and wherein the processor is configured to control the loopback device to modify the other signal.

* * * * *